United States Patent [19]

Tanigawa et al.

[11] Patent Number: 4,537,272
[45] Date of Patent: Aug. 27, 1985

[54] AUTOMOTIVE VEHICLE SPEED CONTROL DEVICE BASED ON A PRESELECTED SPEED

[75] Inventors: Kou Tanigawa, Akashi; Jiro Masuda, Kobe; Kazumasa Nakamura, Okazaki; Kazuhiko Hayashi, Toyota, all of Japan

[73] Assignees: Fujitsu Ten Limited, Kobe; Toyota Jidosha Kabushiki Kaisha, Toyota, both of Japan

[21] Appl. No.: 460,857

[22] Filed: Jan. 25, 1983

[30] Foreign Application Priority Data

Jan. 25, 1982 [JP] Japan ................................. 57-10635
Jan. 25, 1982 [JP] Japan ................................. 57-10638

[51] Int. Cl.³ .............................................. B60K 31/00
[52] U.S. Cl. ...................................... 180/176; 123/352
[58] Field of Search .............. 180/176, 177, 178, 179, 180/175; 123/352; 364/426

[56] References Cited

U.S. PATENT DOCUMENTS 3,028,939  4/1962  Glick ................................. 180/178 X
4,323,134  4/1982  Gray .................................... 180/176
4,359,125  11/1982 Shinoda et al. ..................... 180/179
4,451,890  5/1984  Suzuki et al. ................... 180/176 X

OTHER PUBLICATIONS

Translation of "Cruise Control System (Auto-Drive)", by Kou Tanigawa et al., (an article in the periodical Fujitsu, vol. 30, No. 5, 1979, published by Fujitsu Limited).

Primary Examiner—Joseph F. Peters, Jr.
Assistant Examiner—Michael Mar
Attorney, Agent, or Firm—Cushman, Darby & Cushman

[57] ABSTRACT

A device for controlling the speed of an automotive vehicle based on a preselected vehicle speed, including a vehicle speed detector, an actual speed setting switch, a vehicle speed selection unit, a selected speed presetting switch, and an electronic control unit. The electronic control unit receives the signals from the vehicle speed detector, the actual speed setting switch, the vehicle speed selection unit, and the selected speed presetting switch and generates a signal for control of the output of the vehicle engine.

5 Claims, 14 Drawing Figures

AUTOMOTIVE VEHICLE SPEED CONTROL DEVICE BASED ON A PRESELECTED SPEED

BACKGROUND OF THE INVENTION

1. Field of the Invention

The present invention relates to a device for controlling the speed of an automotive vehicle, more particularly to a device for controlling the speed of the automotive vehicle based on a preselected vehicle speed.

2. Description of the Prior Art

In general, devices for controlling the speed of an automotive vehicle based on a preselected vehicle speed make use of either the setting switch control method for setting the speed at an actual vehicle speed or the presetting switch control method for presetting the speed at an instructed selected speed. These devices, however, are relatively complicated in structure. Therefore, it has been desired to realize more satisfactory control of the speed of an automotive vehicle based on a preselected vehicle speed with a device of a relatively simple structure.

SUMMARY OF THE INVENTION

It is the object of the invention to provide an improved device for controlling the speed of an automotive vehicle based on a preselected vehicle speed, adopting actual speed setting switch control, selected speed presetting switch control, and speed selection, to achieve reliable control of the speed with a use of a device of a relatively simple structure.

According to the present invention, there is provided a device, for controlling the speed of an automotive vehicle based on a preselected vehicle speed, comprising: a vehicle speed detector; a setting switch for the setting operation; a vehicle speed selection means for presetting a desired speed of the vehicle; a presetting switch for the presetting operation; and a control means responsive the signals from the vehicle speed detector, setting switch, vehicle speed selection means, and presetting switch, for generating a signal for driving an actuator for regulating the opening degree of a throttle valve of the automotive vehicle.

DESCRIPTION OF THE PREFERRED EMBODIMENT

Figure 1:
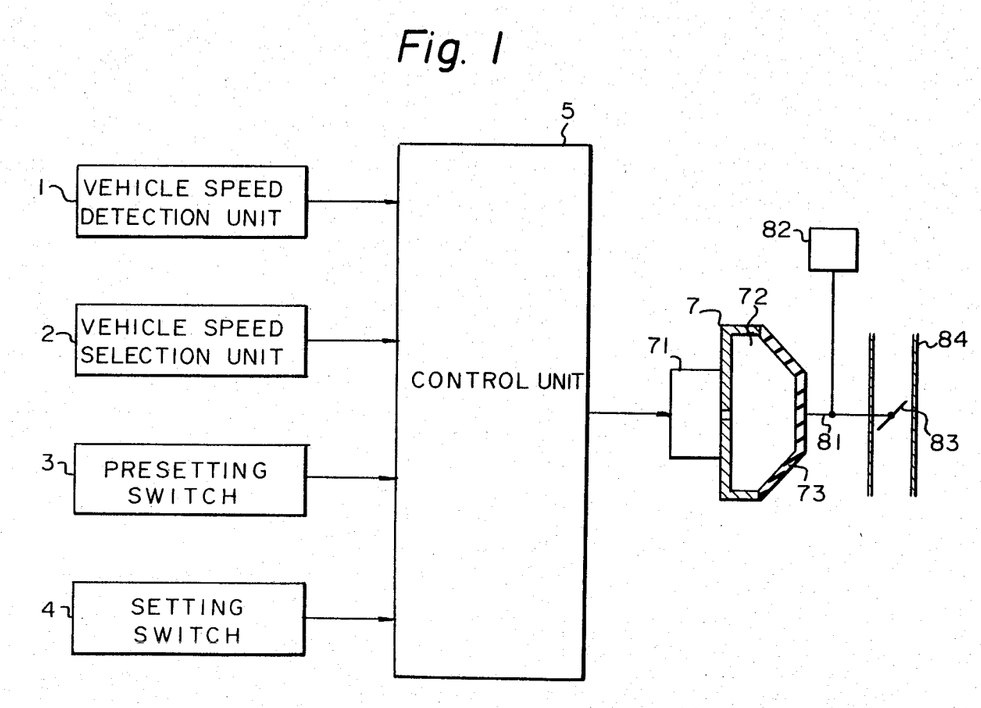
FIG. 1 illustrates the fundamental structure of the device for controlling the speed of an automotive vehicle based on a preselected vehicle speed according to the present invention.

The fundamental structure of the device for controlling the speed of an automotive vehicle based on a preselected vehicle speed in accordance with the present invention is illustrated in FIG. 1.

The device of FIG. 1 includes a throttle valve 83 for controlling the flow of the air-fuel mixture in a supply pipe 84; a link 81 coupled to the throttle valve 83; an acceleration pedal 82 coupled to the link 81; a pneumatic actuator 7 having a solenoid valve 71, an active chamber 72, and a diaphragm 73; a control unit 5 which supplies the control signal to the solenoid valve 71; a vehicle speed detection unit 1; a vehicle speed selection unit 2; a selected speed presetting switch 3; and an actual speed setting switch 4. The output signals of the vehicle speed detection unit 1, the vehicle speed selection unit 2, the presetting switch 3, and the setting switch 4 are supplied to the control unit 5.

The opening degree of the throttle valve 83 is changed by the action of the actuator 7. When the solenoid valve 71 is energized, the active chamber 72 is communicated with a negative pressure source such as an air intake manifold (not shown) and the diaphragm 73 is deformed to move the link 81 to increase the opening degree of the throttle valve 83. When the solenoid valve 71 is de-energized, the active chamber 72 is communicated with the atmosphere and the diaphragm 73 returns to the original state to move the link 81 to decrease the opening degree of the throttle valve 83.

Figure 2:
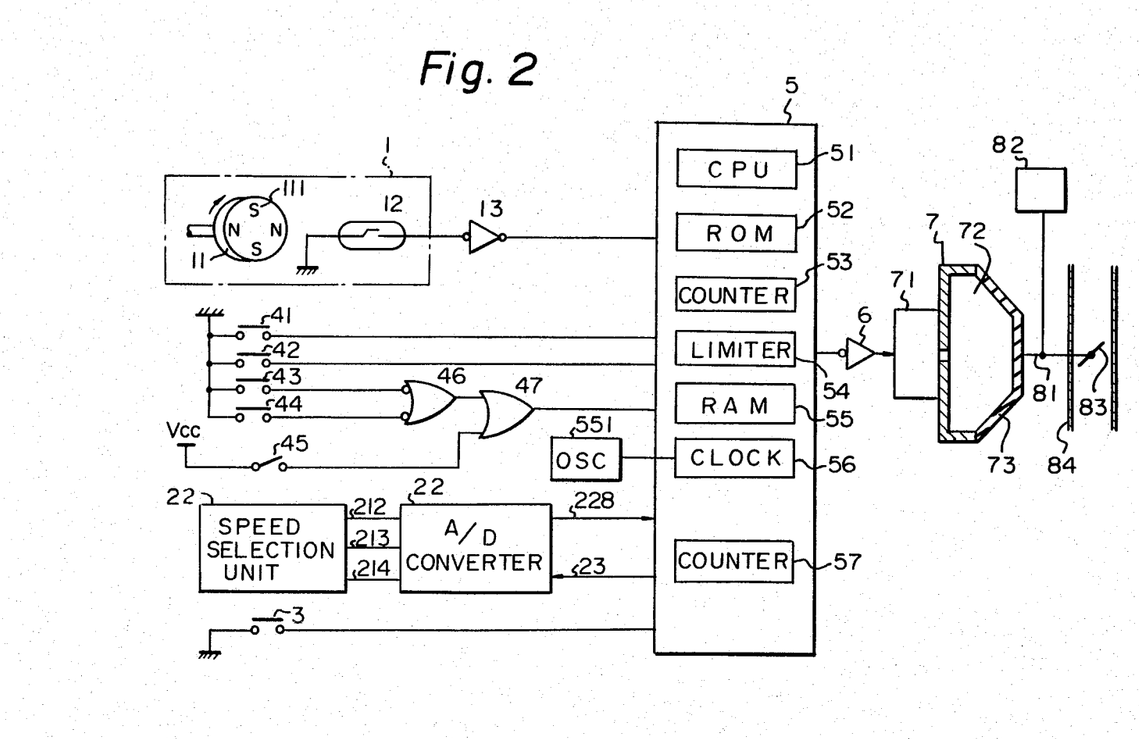
FIG. 2 illustrates an example of the device for controlling the speed of an automotive vehicle based on a preselected vehicle speed according to the structure of the device of FIG. 1.

A device for controlling the speed of an automotive vehicle based on a preselected speed in accordance with an embodiment of the present invention is illustrated in FIG. 2. As can be readily seen, the fundamental structure of the device of FIG. 2 is the same as that of the device of FIG. 1, i.e., in FIG. 2, the signals from parts corresponding to the vehicle speed detection unit 1, vehicle speed selection unit 2, presetting switch 3, and setting switch 4 of FIG. 1 are supplied to a microcomputer corresponding to the control unit 5.

The vehicle speed detection unit 1 includes a disc 11, rotating with the rotation of wheels of the vehicle and magnetized to form N, S poles 111 along the circumference thereof, and a reed switch 12 actuated by the magnetic field of the magnetic poles 111. One terminal of the reed switch 12 is grounded, while the other terminal is connected to a buffer 13. The output terminal of the buffer 13 is connected to the microcomputer 5.

The rotation of the disc 111 due to the running of the vehicle causes a sequence of closings of the reed switch 12 to deliver a pulse signal sequence having a frequency proportional to the actual vehicle speed.

A group of switches, consisting of a setting switch 41, a resuming switch 42, a clutch switch 43, a parking switch 44, and a brake switch 45, is provided in the device of FIG. 2. The second terminals of the setting switch 41 and the resuming switch 42 are connected to the microcomputer 5. The second terminals of the clutch switch 43 and the parking switch 44 are connected to input terminals of an AND gate 46. The first terminals of the setting switch 41, the resuming switch 42, the clutch switch 43, and the parking switch are grounded. The output terminal of the AND gate 46 and the second terminal of the brake switch 45 are connected to input terminals of an OR gate 47. The first terminal of the brake switch 45 is connected to a voltage source $V_{cc}$. The output terminal of the OR gate 47 is connected to the microcomputer 5.

Figure 3:
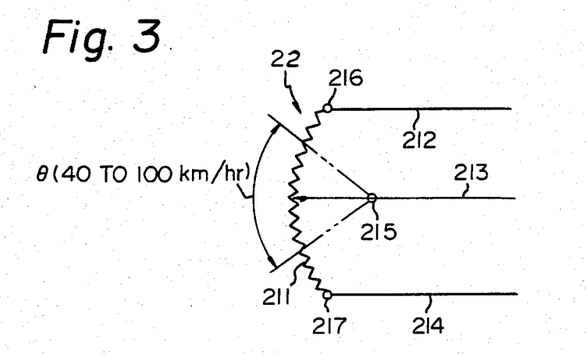
FIG. 3 illustrates an example of the structure of a vehicle speed selection unit in the device of FIG. 2.

A vehicle speed selection unit 2 and an A/D converter 22 are provided in the device of FIG. 2. An example of the structure of the vehicle speed selection unit 21 is illustrated in FIG. 3. The vehicle speed selection unit 2 of FIG. 3 consists of a resistor 211 with two fixed terminals 216 and 217 and a variable terminal 215. The fixed terminals 216 and 217 are connected to lines 212 and 214, respectively, and the variable terminal 215 is connected to line 213. A constant voltage, for example 12 volts, is supplied across the lines 212 and 214. The contact position of the variable terminal 215 on the resistor 211 can be changed manually.

The selected voltage obtained on the line 213 is stored in a random access memory (RAM) 55 in the microcomputer 5. The value of the voltage on the line 213 corresponds to the value of the vehicle speed.

Figure 4:
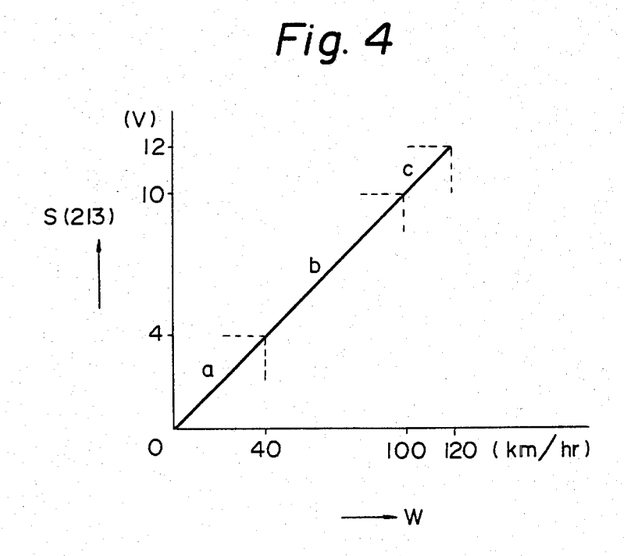
FIG. 4 illustrates the characteristic of the device of FIG. 3.

The relationship between the vehicle speed W in km/hr and the voltage S(213) in volts is shown in FIG. 4. In FIG. 4, the range "a" corresponds to the speed range 0 to 40 km/hr and voltage range 0 to 4 volts; the range "b" corresponds to the speed range 40 to 100 km/hr and voltage range 4 to 10 volts; and the range "c" corresponds to the speed range 100 to 120 km/hr and voltage range 10 to 12 volts.

If the value of the speed stored in the RAM 55 is limited to the range "b", the range in which constant speed running of the vehicle is possible is equal to the range "b". To avoid occurrence of the range "a" or "c", the movement of the variable terminal 215 should be limited by means of, for example, stoppers. Due to such limitation means, the range of selection of resistance of the resistor 211 is limited to angle $\theta$ (40 to 100 km/hr) in FIG. 3. Under such conditions, the value of the voltage S(213) is 4 through 10 volts, corresponding to the speed W of 40 through 100 km/hr.

Figure 5:
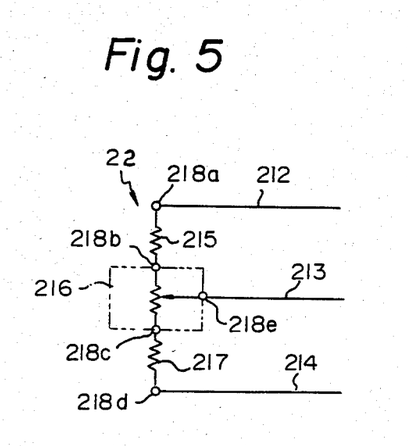
FIG. 5 illustrates another example of the structure of the vehicle speed selection unit in the device of FIG. 2.

Another embodiment of the vehicle speed selection unit 2 is illustrated in FIG. 5. The unit includes fixed resistors 215 and 217 and a variable resistor 216. Two terminals one from each of the fixed resistors 215 and 217, are connected to respective end terminals 218b and 218c of the variable resistor 216. The other terminals 218a and 218d of the fixed resistors 215 and 217 are connected to lines 212 and 214. A variable terminal 218e is connected to a line 213. The range of the change of the voltage of the line 213 is limited to the voltage range 4 to 10 volts due to the existence of the fixed resistors 215 and 217.

Figure 6:
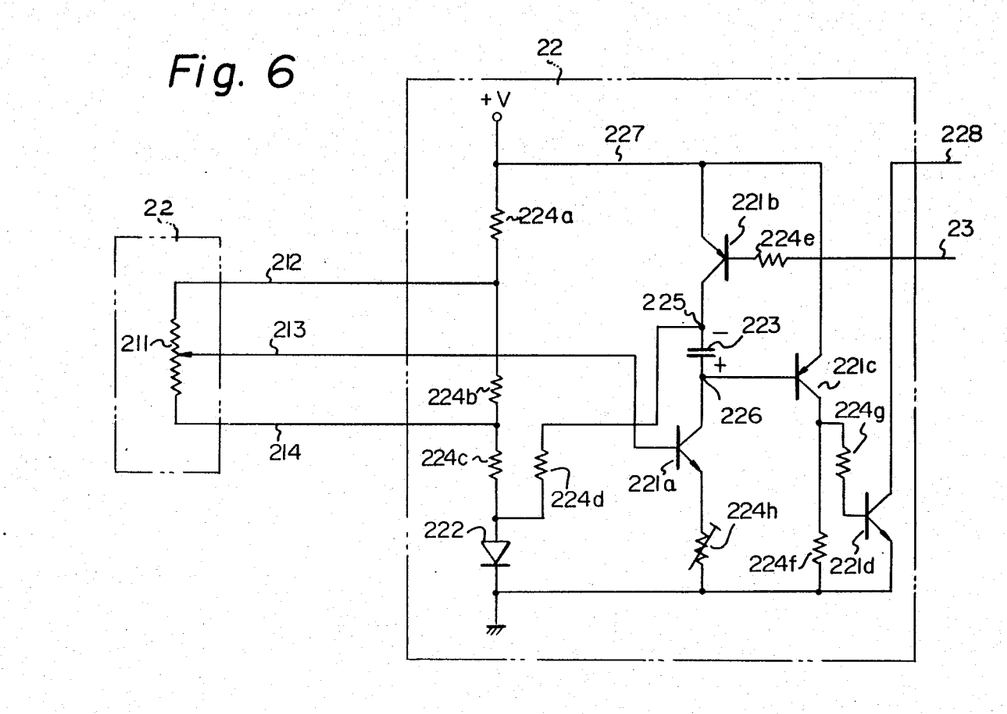
FIG. 6 illustrates an example of the structure of an analog to digital (A/D) converter in the device of FIG. 2.

An example of the structure of the A/D converter 22 is illustrated in FIG. 6. The A/D converter 22 includes transistors 221a, 221b, 221c, and 221d; a diode 222; a capacitor 223; fixed resistors 224a, 224b, 224c, 224d, 224e, 224f, and 224g; and a semivariable resistor 224h. Input terminals of the A/D converter 22 are connected to lines 212, 213, and 214. The collector of the transistor 221d is connected through a line 228 to the microcomputer 5. A line 23 receives the signal for starting the A/D converter 22 from the microcomputer 5. The fixed resistor 224d is connected between the anode of the diode 222 and the junction 225 between the collector of the transistor 221b and the capacitor 223. The potential of a junction 226 between the capacitor 223 and the collector of the transistor 221a is supplied to the base of the transistor 221c. The signal of the collector of the transistor 221c is supplied through the fixed resistor 224g to the base of the transistor 221d. The transistor 221b serves as the starting transistor, the transistor 221c serves as the level discrimination transistor, and the transistor 221d serves as the buffer transistor. When the potential of the line 213 is changed by the operation of the vehicle speed selection unit 2, the potential of the base of the transistor 221a is changed. Hence, the current of the collector of the transistor 221a is changed.

Figure 7:
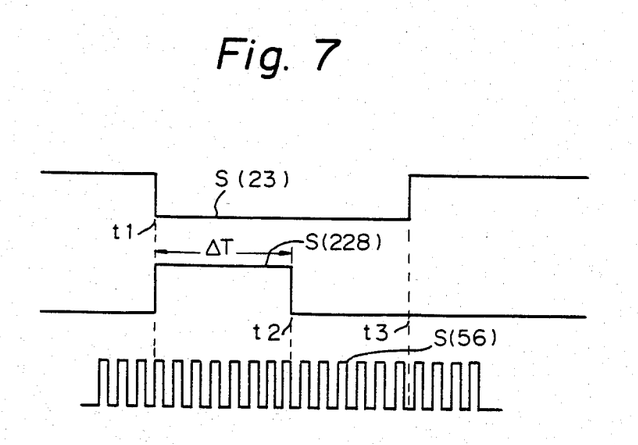
FIGS. 7 and 8 illustrate the waveforms of the signals for the A/D converter of FIG. 6.

The operation of the A/D converter 22 will be described below with reference to FIG. 7. Before the instant t1, the potential of the line 23 is high. Hence, the transistor 221b is in the OFF state and the potential of the point 225 is approximately equal to the ground potential through the resistor 224d and the diode 222. In this state, the collector current of the transistor 221a is selected far smaller than the emitter-base current of the transistor 221c, but the transistor 221c is in ON state. Hence, the potential of the point 226 is approximately equal to the potential of the voltage source line 227 of the potential (+V), so that the capacitor 223 is maintained in the charged state under the above-described condition. In this state, the transistor 221d is in the ON state. Hence, the potential of the signal S(228) on the line 228 is LOW.

When the potential of the signal S(23) on the line 23 turns LOW at the instant t1, the transistor 221b turns ON. Hence, the potential of the point 225 becomes approximately equal to the potential (+V) of the line 227. Thus, the potential of the point 226 becomes approximately equal to 2 volts. Hence, the transistor 221c turns OFF. In this state, the capacitor 223 is discharged through the transistor 221a with the constant current corresponding to the potential of the line 213. Hence, the potential of the point 226 is decreased with time. Because of the turning OFF of the transistor 221C, the transistor 221d is turned OFF. Hence, the potential of the line 228 becomes HIGH.

When the transistor 221c turns ON at instant t2, which is $\Delta T$ later than instant t1, the transistor 221d is turned ON. Hence, the potential of the line 228 becomes again LOW. The potential of the line 23 is made HIGH at instant t3 after instant t2.

The microcomputer 5 includes a central processing unit (CPU) 51, a (ROM) 52, a counter 53, a speed limitation unit 54, the RAM 55, a clock unit 56 connected with a crystal oscillator 551, and a counter 57. The microcomputer 5 receives the signals from the buffer 13, the setting switch 41, the resuming switch 42, the OR gate 47, the line 228 and a presetting switch 3. The microcomputer 5 supplies the signal S(23) through the line 23 to the A/D converter 22. The output signal resulting from the operation in the microcomputer 5 is supplied from the microcomputer 5 through a buffer 6 to the solenoid valve 71.

The counter 57 counts the time length $\Delta T$ in connection with the execution of the program for the microcomputer 5. The clock unit 56 produces the pulse S(56) shown in FIG. 7. The pulses from the clock unit 56 or the frequency-divided pulses from the clock unit 56 are counted by the counter 57.

It should be noted that the time length $\Delta T$ from instant t1 to instant t2 corresponds to the output signal of the vehicle speed selection unit 2 and, accordingly, to the selected vehicle speed which is to be stored in the RAM 55.

Under the condition that the signal S(213) corresponcrng to the desired selected vehicle speed is present in the line 213, when a presetting switch 3 is actuated, the microcomputer 5 supplies the starting signal S(23) on the line 23. Hence, a signal whose potential falls to LOW after the time length ΔT is produced from the A/D converter 22 to the line 228. This time length ΔT is counted by the counter 57.

The selected vehicle speed counted by the counter 57 is discriminated by the high-speed and low-speed limitation unit 54. Hence, it is decided whether or not the selected vehicle speed lies within the range "b" shown in FIG. 4. If it is decided that the selected vehicle speed is higher than 100 km/hr (FIG. 4, range "c") or lower than 40 km/hr (FIG. 4, range "a"), the storing of the selected vehicle speed to the RAM 55 is prohibited by the speed limitation unit 54.

The fail-safe characteristic of the vehicle speed selection unit 2 of FIG. 3 will now be described. If disconnection occurs between the terminal 217 and the resistor 211, a potential which is approximately equal to the potential of the line 212 is produced on the line 213. Hence, the potential of the line 213 lies within the range "c" (FIG. 4). Hence, the fail safe feature prevents a signal in range "c" from being stored in the RAM 55.

If disconnection occurs between the terminal 216 and the resistor 211, the potential of the line 213 becomes approximately equal to the potential of the line 214. Hence, the potential of the line 213 lies within the range "a" (FIG. 4). Hence, the fail safe feature also prevents a signal in range "a" from being stored in the RAM 55.

Thus, the signal on the line 213 when the vehicle speed selection unit 2 is in the state of the above-mentioned failures is not stored in the RAM 55. Hence, sudden acceleration or sudden deceleration due to manipulation of the defective vehicle speed selection unit 2 is prevented and safe running of the vehicle is ensured.

The same fail-safe characteristic is realized in the vehicle speed selection unit 2 of FIG. 5 as the vehicle speed selection unit 2 of FIG. 3.

The function of the speed limitation unit 54 is achieved also in the case where the vehicle is running and the setting switch 41 is actuated so as to store the present vehicle speed in the RAM 55 as the selected vehicle speed. In this case, only the selected vehicle speed within the range "b" of FIG. 4 is stored in the RAM 55.

Although, in the above described embodiment, the selected vehicle speed is represented by the time length ΔT between the potential changes of the pulse signal S(23) on the line 23, it is also possible for the selected vehicle speed to be represented by other aspects of the pulses, such as pulse width and the time difference between adjacent pulses.

The timing control in the microcomputer 5 will be described with reference to FIG. 8. The time length for performing an instruction in the microcomputer 5 is, for example, 3 μ sec. The interval of the counting by the counter 57 is selected to be, for example, 100μ sec. The time length ΔT is obtained from the calculation of the difference between the counts at instant t1 and the counts at instant t2 of the counter 57. Accordingly, the correct determination of the time length ΔT cannot be carried out unless timing t1 and timing t2 coincide with the counting timings of the counter 57.

Figure 8:
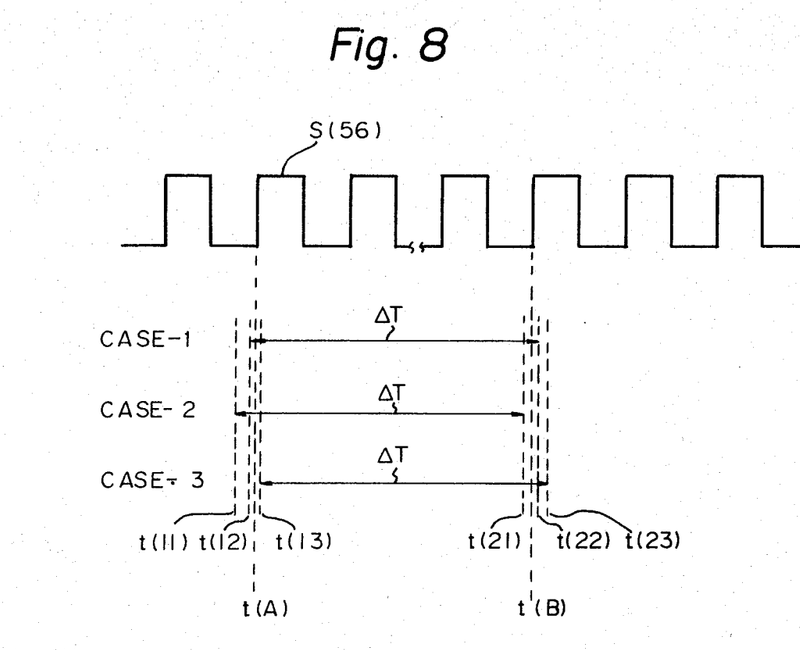

The waveform in FIG. 8 represents the pulse S(56) produced from the clock unit 56. The timing t(A) is a rising edge of the pulse S(56). The timing t(B) is another rising edge of the pulse S(56). The count-start timing of the counter 57 is changed as t(11), t(12), and t(13). The count-stop timing of the counter 57 is changed as t(21), t(22), and t(23).

It is assumed that "P" rising edges are counted in CASE-1 during the period ΔT between t(12) and t(22). Then, "P−1" rising edges will be counted in CASE-2 during the period ΔT between t(11) and t(21), and "P−1" rising edges will be counted in CASE-3 during the period ΔT between t(13) and t(23).

Thus, the count value of the time length ΔT by the counter 57 is either "P" or "P−1" when the time length ΔT is measured in accordance with CASE-1, CASE-2, and CASE-3. These changes in the count value could cause an error in the operation of the device. Accordingly, there has been a problem that the precise adjustment of the resistance of the semivariable resistor 224h of the A/D converter 22 is difficult to be achieved.

However, in the device of FIG. 2 according to the present invention, the vehicle speed selection unit 2 is connected to the lines 212, 213, and 214, and the resistance of the semivariable resistor 224h is adjusted so as to realize the obtainment of the constant count "P". Therefore, no error occurs in the counting of the time length ΔT by counters. (In general, approximately 1000 rising edges are included in the time length ΔT.)

The operation of the microcomputer 5 in the device of FIG. 2 will be described below with reference to the flow charts of FIGS. 9, 10, and 11. The waveform of the pulse supplied to the microcomputer 5 from the buffer 13 is illustrated in FIG. 12.

Figure 9:
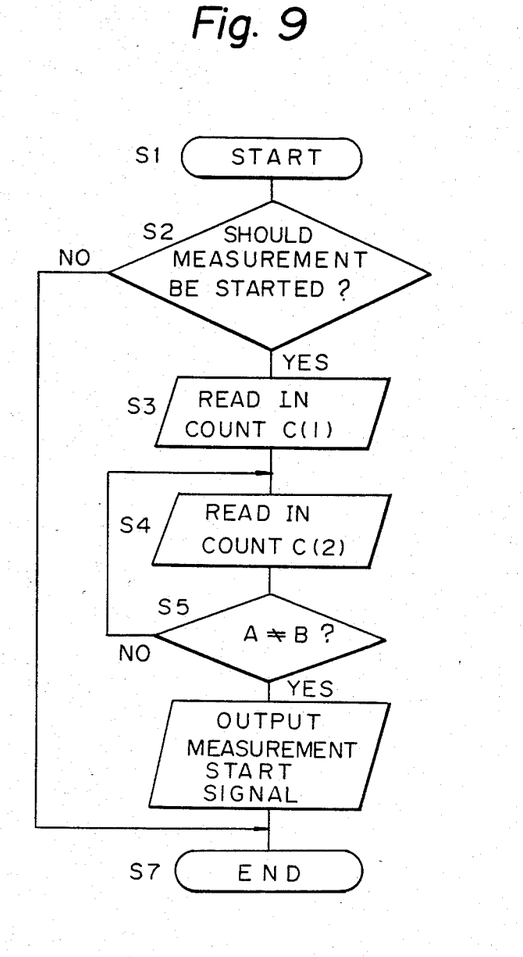
FIGS. 9, 10, and 11 illustrate flow charts of the operation of a microcomputer in the device of FIG. 2.

The routine of FIG. 9 consists of steps S1 through S7. In step S1, the routine is started. In step S2, the decision as to whether or not the measurement should be started is carried out. When the decision is YES, the routine proceeds to step S3 where the count C(1) of the counter 57 is read in. In step S4, the count C(2) of the counter 57 is again read in. In step S5, the decision as to whether or not the count C(2) is different from the count C(1) is carried out. When the decision is NO, the routine returns to step S4 where the reading in of the count C(2) of the counter 57 is carried out again. When the decision is YES, the routine proceeds to step S6 where the measurement is started by delivering the start signal S(23) of LOW potential from the microcomputer 5 through the line 23 to the A/D converter 22. The routine then proceeds to step S7 for finishing. When the decision of step S2 is NO, the routine proceeds directly to step S7.

The time length for performing the instructions of steps S3 through S6 is less than several 3 msec periods and is shorter than the interval of 100 msec of the counting of the counter 57.

In accordance with steps S4 and S5, the counting of the counter 57 due to the starting of the A/D converter 22 is started immediately after the change of the count from C(1) to C(2). Accordingly, the time length ΔT is determined as an invariable amount.

Figure 10:
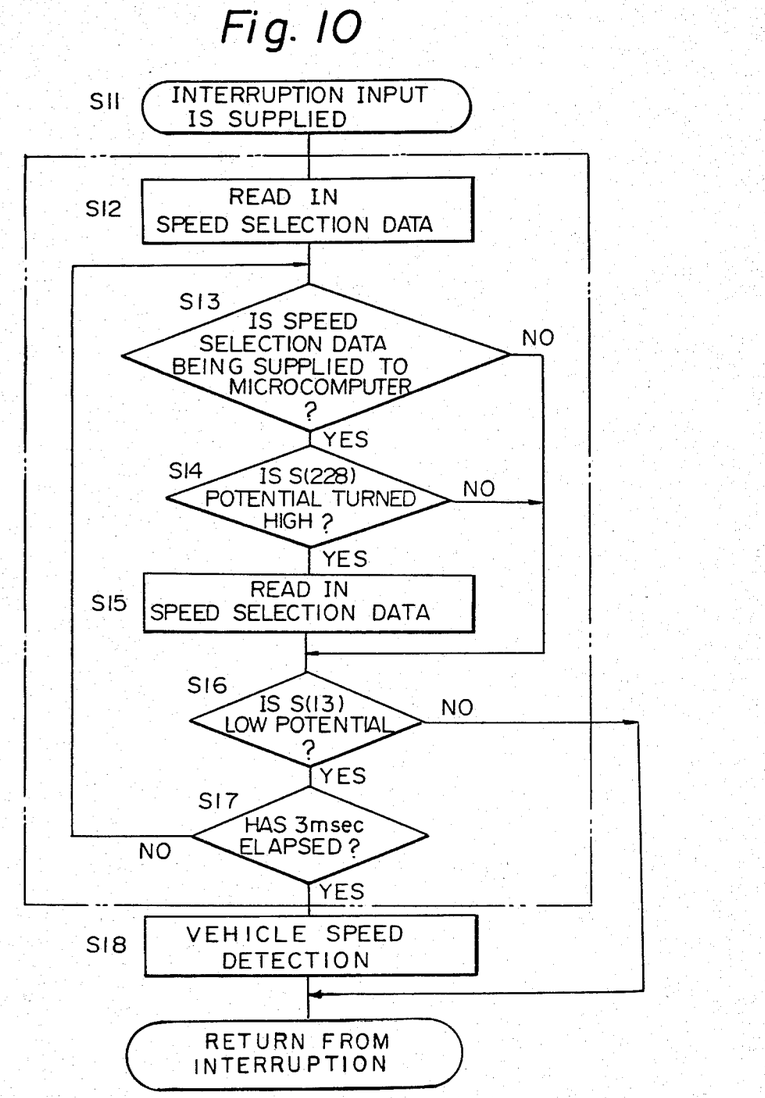

The routine of FIG. 10 consists of steps S11 through S18. In step S11, the trailing edge of the pulse S(13) is supplied to the microcomputer 5 as an interruption input signal and, hence, the routine is started. In step S12, the data of the vehicle speed selection unit 2 is read in. In step S13, the decision as to whether or not the signal from the A/D converter 22 is being supplied through the line 228 to the microcomputer 5 is carried out.

When the decision is YES, the routine proceeds to step S14 where the decision as to whether or not the potential of the signal S(228) is turned HIGH at t2 is carried out. When the decision of step S14 is YES, the routine proceeds to step S15 where the data of the vehicle speed selection unit 2 is read in.

When each of the decisions of steps S13 and S14 is NO, the routine proceeds directly to step S16. In step S16, the decision as to whether the potential of the pulse S(13) supplied to the microcomputer 5 is LOW is carried out. When the decision is NO, the routine returns from the interruption program. When the decision is YES, the routine proceeds to step S17 where the decision as to whether or not 3 msec have elapsed since step S11 with reference to the data read in step S12 is carried out. When the decision is NO, the routine returns to step S13.

When the decision of step S17 is YES, the routine proceeds to step S18 where the actual vehicle speed is detected.

Figure 11:
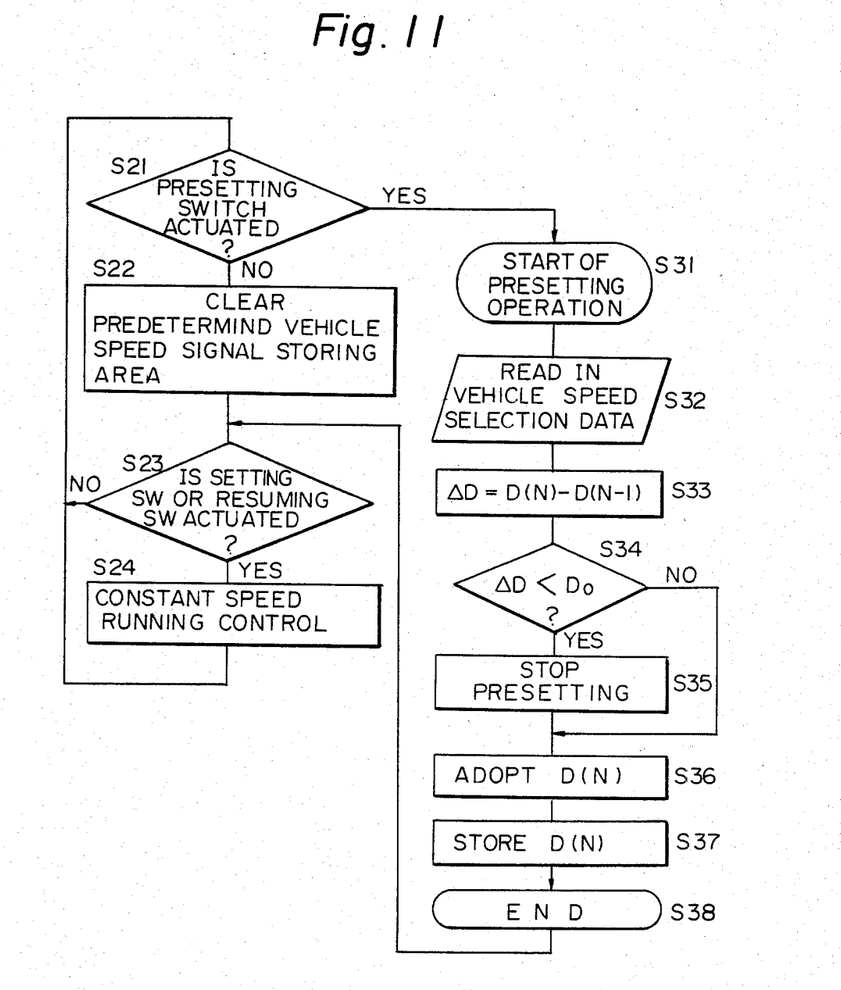
Figure 12:
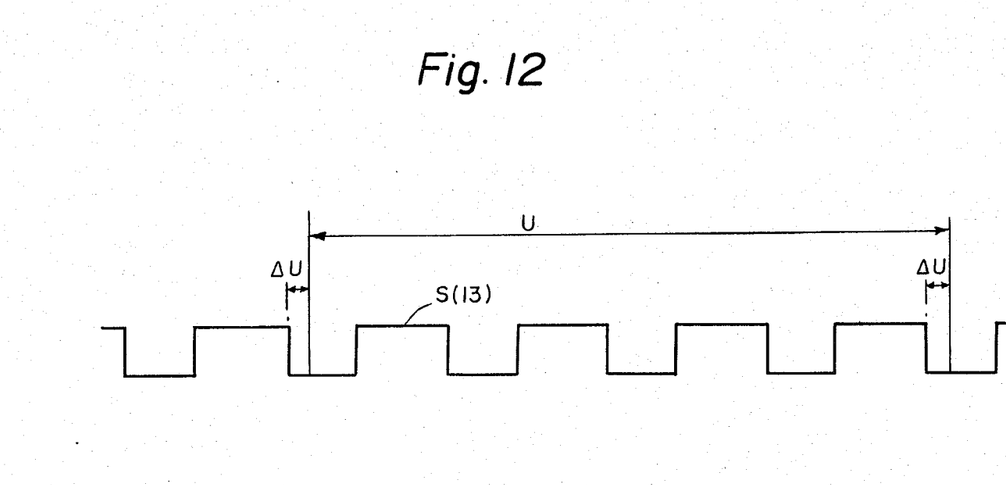
FIG. 12 illustrates the waveform of the signal based on the speed detection supplied to the microcomputer in the device of FIG. 2.

The routine of FIG. 11 consists of steps S21 through S24 and S31 through S38. In step S21, the decision as to whether the presetting switch 3 is actuated is carried out. When the decision is NO, the routine proceeds to step S22 where the storing area into which the predetermined vehicle speed signal is to be stored is cleared.

In step S23, the decision as to whether either the setting switch 41 or the resuming switch 42 is actuated is carried out. When the decision is YES, the routine proceeds to step S24 where the control of the constant speed running is carried out and the routine returns to step S21.

When the decision of step S23 is NO, the routine returns to step S21.

When the decision of step S21 is YES, the routine proceeds to step S31 where the presetting operation is started. In step S32, the data of vehicle speed selection unit 2 is read in. In step S33, the difference $\Delta D$ between the vehicle speed selection data $D(N)$ for the Nth measurement timing and the vehicle speed selection data $D(N-1)$ for the $(N-1)$th measurement timing is calculated. The interval between the timing $(N-1)$ and the timing N is, for example, 100 msec.

In step S34, the decision as to whether or not the difference $\Delta D$ is less than a predetermined speed $D_0$ of, for example, 2 km/hr is carried out. When the decision is YES, the routine proceeds to step S35 where the presetting operation is stopped. When the decision of step S34 is NO, the routine proceeds directly to step S36.

In step S36, the obtained data $D(N)$ is adopted as the selected vehicle speed. In step S37, the data $D(N)$ is stored into the RAM 55. In step S38, the presetting operation is finished, and the routine proceeds to step S23.

Thus, the reading-in of the data of the vehicle speed selection which is to be preset is repeated until the difference between two adjacent sequential data becomes less than a predetermined amount. Accordingly, the correct storing of the vehicle speed selection data into the RAM 55 is ensured, even if the output signal of the vehicle speed selection unit 2 is disturbed by noise.

With regard to the routine of FIG. 10, the waveform of the pulse S(13) supplied from the buffer 13 to the microcomputer 5 will be explained with reference to FIG. 12. One rotation of the rotary disc 11 produces a pulse wave with a number of the LOW level portions equal to the number of the magnetic N, S poles 111.

The actual vehicle speed can be detected by counting the time length U which corresponds to four high level portions of the pulse S(13) by using the counter 53.

The pulse from the speed detection unit 1 is detected only after the closing state of the reed switch 12 is maintained for more than a predetermined time length $\Delta U$ of, for example, 3 msec. Accordingly, incorrect detection of the pulse from the detection unit 1 due to the chattering of the reed switch 12 is prevented.

However, interruption of the operation of the microcomputer 5 for this 3 msec period may prevent the operation of other programs of the microcomputer 5 from being performed, since 3 msec is far longer than the time length for performing the program of the microcomputer 5. To counter this problem, step S14 is included in the routine of FIG. 10, in which the decision as to whether or not the potential of the signal S(228) is turned HIGH at t2 is carried out. Accordingly, in the device of FIG. 2, the selection of the vehicle speed with high precision for presetting is achieved.

Another example of the device for controlling the speed of an automotive vehicle based on a preselected vehicle speed according to the structure of the device of FIG. 1 will be described with reference to FIGS. 13 and 14.

Figure 13:
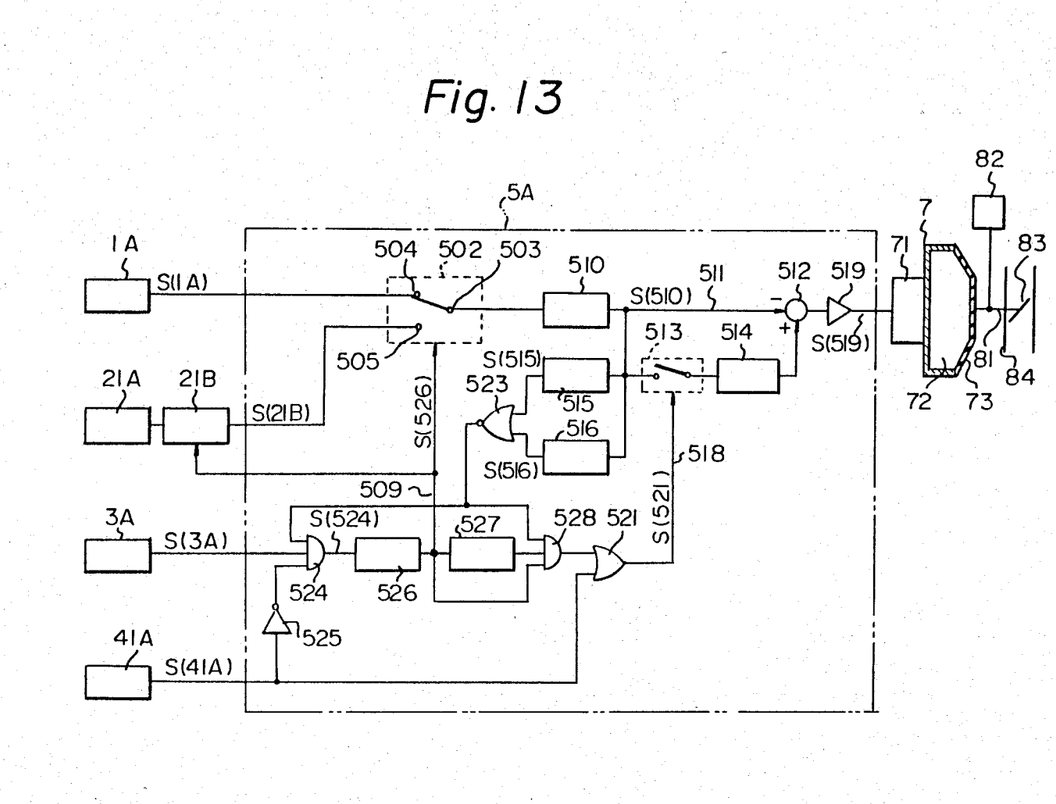
FIG. 13 illustrates another example of the device for controlling the speed of an automotive vehicle based on a preselected vehicle speed according to the structure of the device of FIG. 1.

The device of FIG. 13 includes a vehicle speed detection unit 1A, a vehicle speed selection unit 21A; a vehicle speed simulation signal generating unit 21B; a presetting switch 3A; a setting switch 41A; a control unit 5A; an actuator 7 having a solenoid valve 71, an active chamber 72, and a diaphragm 73; a throttle valve 83 for controlling the flow of the airfuel mixture in a supply pipe 84; an accelerator pedal 82; and a link 81 coupled to the accelerator pedal 82 and the throttle valve 83.

The vehicle speed simulation signal generating unit 21B produces a vehicle speed simulation signal representing the vehicle speed corresponding to the output signal of the vehicle speed selection unit 21A. The vehicle speed simulation signal is produced in the form of a sequence of pulses having a frequency proportional to the vehicle speed.

The control unit 5A includes a first switch 502 having fixed contacts 504 and 505 and a variable contact 503; a frequency-to-voltage converter 510; a subtraction circuit 512; a duty control circuit 519; a NOR gate 523; a higher speed limiter for speed discrimination 515; a lower speed limiter for speed discrimination 516; a second switch 513; a memory circuit 514; an AND gate 524; an inverter 525; a monostable multivibrator 526; a delay circuit 527; an AND gate 528; and an OR gate 521.

The variable contact 503 makes contact with the first fixed contact 504 and the vehicle speed simulation signal generating unit 21B is de-activated when the potential of the signal S(526) on a line 509 is LOW. The variable contact 503 makes contact with the second fixed contact 505 and the vehicle speed simulation signal generating unit 21B is activated when the potential of the signal S(526) on the line 509 is HIGH.

The switch 513 is closed when the potential of the signal S(521) on a line 518 is HIGH and is open when this potential is LOW.

The subtraction circuit 512 carries out the subtraction of the signal S(514) from the memory circuit 514 by the signal S(510). The duty control circuit 519 supplies the signal S(519) to the solenoid valve 71. If the signal S(519) represents an instruction for acceleration, the solenoid valve 71 is operated to increase the absolute value of the negative pressure in the active chamber 72 to increase the opening degree of the throttle valve 83. Contrary to this, if the signal S(519) represents an instruction for deceleration, the solenoid valve 71 is operated to decrease the absolute value of the negative pressure in the active chamber 72 to decrease the opening degree of the throttle valve 83.

The higher speed limiter 515 and the lower speed limiter 516 carry out the speed discrimination function. The potential of the signal S(515) of the limiter 515 is HIGH when a signal S(510) is higher than the signal S(HL) which corresponds to the higher limit speed and is LOW when the signal S(510) is lower than the signal S(HL). The signal S(HL) represents the speed of, for example, 100 km/hr. The potential of the signal S(516) of the limiter 516 is LOW when the signal S(510) on line 511 is lower than the signal S(LL), which corresponds to the lower limit speed, and is HIGH when the signal S(510) is higher than the signal S(LL).

The operation of the device of FIG. 13 will be described below. When the setting switch 41A is switched ON by the driver, the signal S(521) of high potential is supplied to the line 518 from the OR gate 521 to cause the switch 513 to turn ON. Hence, it is possible to store the data of the actual vehicle speed into the memory circuit 514.

When the desired selected vehicle speed is introduced by the vehicle speed selection unit 21A independently from the actual vehicle speed and the presetting switch 3A is switched ON, without switching ON the setting switch 41A, if the signal S(510) on the line 511 is lower than the higher speed limit S(HL) of the limiter 515 and higher than the lower speed limit S(LL) of the limiter 516, the potential of the output signal S(523) of the OR gate 523 becomes HIGH.

Figure 14:
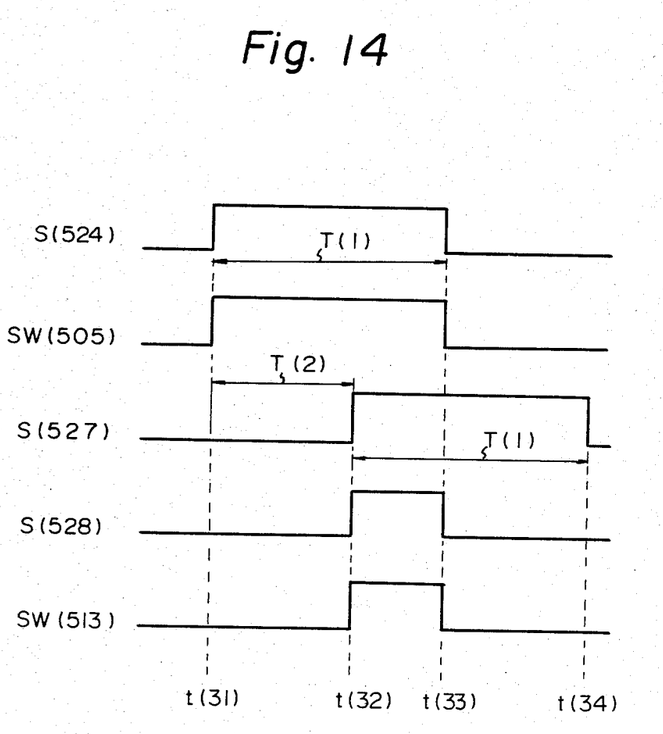
FIG. 14 illustrate the characteristic of the operation of the device of FIG. 13.

Then, the potential of an output signal S(524) of the AND gate 524 becomes HIGH during the period T(1) from timing t(31) to timing t(33) (FIG. 14). Hence, the variable contact 503 of the first switch 502 makes contact with the second fixed contact 505 during this period. Accordingly, the signal from the vehicle speed simulation signal generating unit 21B is supplied to the frequency-to-voltage converter 510 to produce the signal S(510). The delay circuit 527 supplies the signal S(527) (FIG. 14) to the AND gate 528. The HIGH potential of the signal S(527) is started at t(32), which is the time length T(2) delayed from t(31), and lasts for the time length T(1) until t(34).

Then, the signal S(528) (FIG. 14) is delivered from the AND gate 528. Hence, the second switch 513 is switched ON from timing t(32) to timing t(33) (FIG. 14, SW(513)). Accordingly, the signal S(510) of the frequency-to-voltage converter 510 corresponding to the signal of the vehicle speed simulation signal generating unit 21B is stored in the memory circuit 514. The period from t(32) to t(33) is selected to be sufficient to achieve the storing action of the memory circuit 514.

After timing t(33), the potential of the output signals of the AND gates 524 and 528 are LOW. Hence, the variable contact 503 of the first switch 502 makes contact with the first fixed contact 504, and the second switch 513 is switched OFF.

Since the data of the vehicle speed selection unit 21A stored in the memory circuit 514 cannot be changed after the storing action is carried out by the operation of the presetting switch 3A, sudden acceleration or sudden deceleration of the automotive vehicle is prevented, even if the vehicle speed selection unit 21A is inadvertently manipulated.

When both the presetting switch 3A and the setting switch 41A are switched ON, the signal S(41A) of HIGH potential of the setting switch 41A is inverted by the inverter 525 and the inverted signal is supplied to the AND gate 524. Hence, the potential of the signal S(524) of the AND gate 524 is maintained in the LOW potential. For the same time, the potential of the signal S(521) of the OR gate 521 is made HIGH due to the HIGH potential S(41A). Hence, the second switch S(513) is switched ON. Under these conditions, the data of the actual vehicle speed is stored into the memory circuit 514. Thus, only the operation on the basis of the switching-on of the setting switch 41A is carried out, suppressing the presetting operation on the basis of the switching-on of the presetting switch 3A.

When the desired selected vehicle speed is introduced by the vehicle speed selection unit 21A independently from the actual vehicle speed and the presetting switch 3A is switched ON, without switching ON the setting switch 41A, if the signal S(510) on the line 511 is either higher than the higher speed limit S(HL) of the limiter 515 or lower than the lower speed limit S(LL) of the limiter 516, the potential of the output signal S(523) of the OR gate 523 is maintained LOW. Hence, the potentials of the output signals of the AND gates 524 and 528 are maintained LOW. Accordingly, no presetting operation on the basis of the switching-on of the presetting switch 3A is carried out.

The condition of the storing of the data of the selected vehicle speed into the memory circuit 514 will be again described below.

In the period T(1) from t(31) to t(33) (FIG. 14), the signal S(510) representing the selected vehicle speed is supplied on the line 511, and the discrimination of the signal S(510) is carried out by the higher speed limiter 515 and the lower speed limiter 516.

If the signal S(510) is lower than the signal S(HL) and higher than the signal S(LL), the potential of the signal S(523) of the NOR gate 523 is HIGH. Hence, the second switch 513 is switched ON during the period from t(32) to t(33), and the signal S(510) is stored in the memory circuit 514.

If the signal S(510) is either higher than the signal S(HL) or lower than the signal S(LL), the potentials of the output signals of the limiters 515 and 516 are HIGH. Hence, the potential of the signal S(523) is LOW, and the potentials of the AND gates 524 and 528 are forced to be LOW. Hence, no signal representing the selected vehicle speed is stored in the memory circuit 514. Thus, abnormal signals from the vehicle speed simulation signal generating unit 21B, which might be produced due to the failure in the operation of the vehicle speed selection unit 21A or the vehicle speed simulation signal generating unit 21B, are prevented from being stored in the memory circuit 514. Accordingly, the safety of the vehicle running is ensured.

We claim:

1. A device for controlling the speed of an automotive vehicle based on a selected vehicle speed, said device comprising:

a vehicle speed detector for detecting the actual vehicle speed of said vehicle and generating a signal representative of said actual vehicle speed;

an actual speed setting switch for enabling speed control based on a desired actual vehicle speed;

adjustable speed selection means for generating a signal in accordance with a preselected vehicle speed from within a predetermined range of speeds;

a selected speed presetting switch for enabling speed control based on said preselected vehicle speed;

a pneumatic actuator for changing the opening degree of a throttle valve;

control means responsive to signals from said vehicle speed detector, said actual speed setting switch, said adjustable speed selection means and said selected speed presetting switch, for generating a signal for controlling said pneumatic actuator by comparing said detected actual vehicle speed to either said preselected vehicle speed or said desired actual vehicle speed, wherein vehicle speed may be selectively controlled in accordance with the detected actual vehicle speed when said actual speed setting switch is actuated and in accordance with said preselected vehicle speed when said selected speed presetting switch is actuated.

2. A device as defined in claim 1, wherein said control means consists of a microcomputer.

3. A device as defined in claim 2, wherein said microcomputer includes a memory into which said selected vehicle speed is stored.

4. A device according to claim 1, wherein said adjustable speed selection means comprises a speed selection member of the variable resistor type and an analog-to-digital converter.

5. A device as claimed in claim 1, wherein said control means comprises:

a first switch having a first position for receiving said actual speed signal from said vehicle speed detector and a second position for receiving said preselected vehicle speed signal from said adjustable speed selection means, wherein actuation of said actual speed setting switch maintains said first switch in said first position and actuation of said selected speed presetting switch switches said first switch to said second position, for a predetermined time, providing said actual speed setting switch has not been actuated;

vehicle speed discrimination means coupled to said first switch for receiving a speed output signal from said first switch, for determining whether said speed output signal represents a speed within a predetermined range of speeds, and for generating a speed discrimination signal when said speed output signal represents a speed within said predetermined range of speeds;

memory means for selectively storing data from said actual speed signal and said preselected vehicle speed signal;

a second switch, operatively coupled between said first switch and said memory means, having a first position for allowing data storage in said memory means and a second position preventing data storage in said memory means, wherein said second switch is switched to its first position by actuation of said actual speed setting switch for allowing data from said actual speed signal to be stored in said memory means;

delay means for delaying placement of said second switch into said first position in response to said speed discrimination signal and actuation of said selected speed presetting switch, so that said second switch is placed into said first position, after said first switch is switched to its second position for said predetermined time, for allowing data from said preselected vehicle speed signal to be stored in said memory means;

subtraction means responsive to signals from said vehicle speed detector and said memory means for generating an acceleration/deceleration signal; and duty control means responsive to said acceleration/deceleration signal for controlling said pneumatic actuator thereby changing the opening degree of said throttle valve.

* * * * *